(No Model.)
C. H. SALISBURY.
WIRE STRETCHER.
No. 466,911.  Patented Jan. 12, 1892.
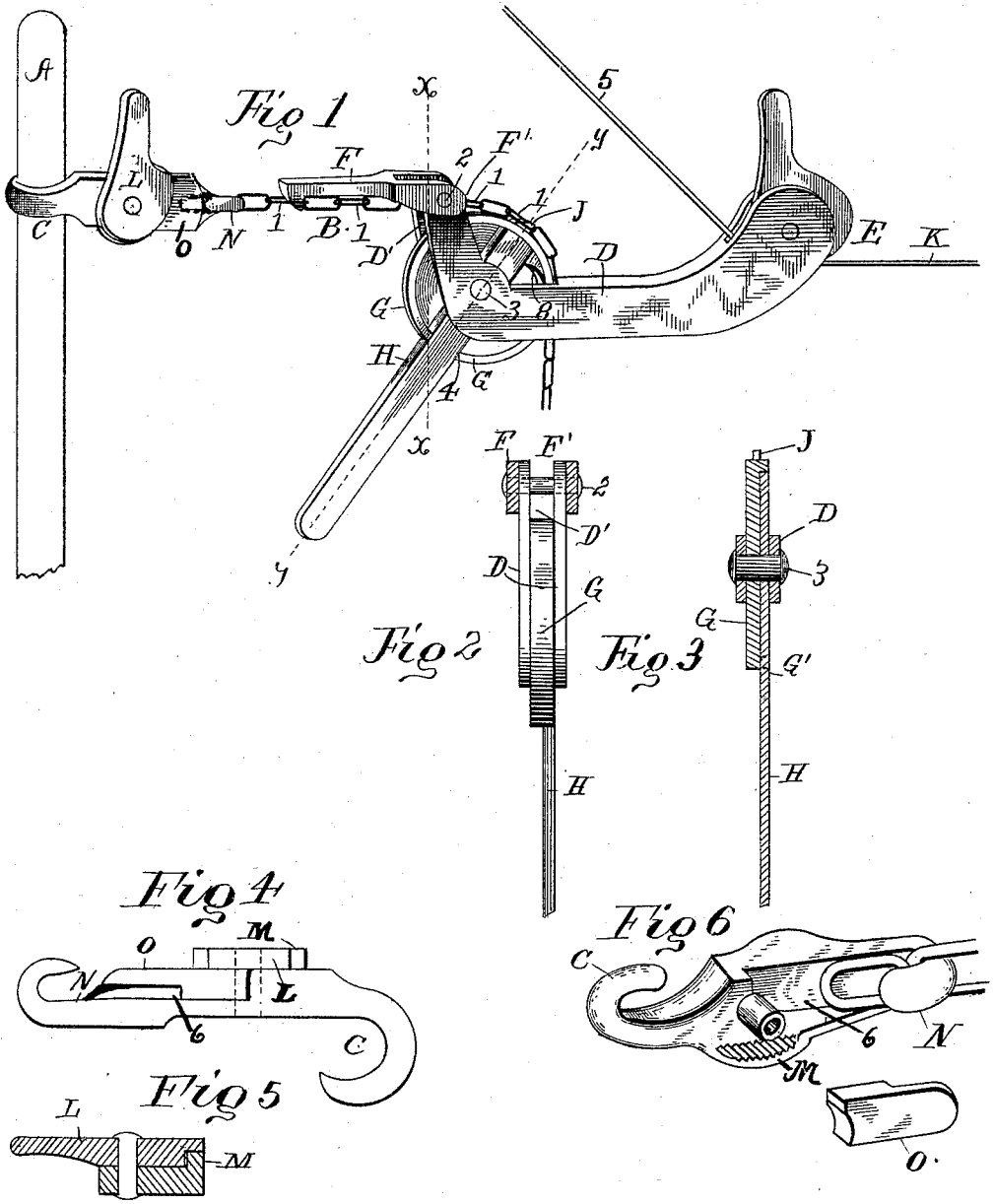
Witnesses
C. C. Burdine
J. B. Owens
Inventor
Charles H. Salisbury
per Jno. G. Manahan
his Attorney

UNITED STATES PATENT OFFICE.

CHARLES H. SALISBURY, OF DE KALB, ILLINOIS.

WIRE-STRETCHER.

SPECIFICATION forming part of Letters Patent No. 466,911, dated January 12, 1892.

Application filed April 28, 1891. Serial No. 390,773. (No model.)

*To all whom it may concern:*

Be it known that I, CHARLES H. SALISBURY, a citizen of the United States, residing at De Kalb, in the county of De Kalb and State of Illinois, have invented certain new and useful Improvements in Wire-Stretchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in wire-stretchers, and is particularly adapted for stretching fence-wires, either in the original construction of the fence or in subsequent repairs thereof or changes therein.

My invention involves the use of a chain having open links and provided at one end with a clamp adapted to engage one end of the wire in instances where it is desired to bring two ends of different wires into junction, and further provided at the same end with a hook, by means of which that end of the chain can be readily attached to a post by passing the hooked end of the chain around the latter and engaging the hook over the main body of the chain.

My invention also involves a stretcher-frame through which said chain is passed, and in which frame there is journaled a wheel having a rim adapted to carry said chain, and a tooth or lug on the periphery of said wheel adapted to engage optionally the links of said chain, and, further, in said frame there is a hook-pawl pivotally seated astride said chain and adapted to automatically engage the links of said chain by its own gravity in the intermittent oscillation of said toothed wheel, which latter is oscillated by a hand-lever suitably fulcrumed thereon. Said frame is further provided at its opposite end with a wire-engaging clamp adapted to grasp and hold the end of the wire which is drawn by the operation of the stretcher aforesaid.

The object of my invention is to furnish a simple, strong, durable, and forcible wire-stretcher which will efficiently either draw the wire to the post or draw the free ends of two different wires together. I attain these objects by the mechanism illustrated in the accompanying drawings, in which—

Figure 1 is a perspective of a machine embodying my invention. Fig. 2 represents a cross-section on the line $x\ x$ of Fig. 1. Fig. 3 is a similar view on the line $y\ y$. Fig. 4 is a plan view of the combined clamp and hook at the operative end of the chain. Fig. 5 is a cross-sectional view thereof, and Fig. 6 is a perspective view of the same without the lever and having the block or washer separated therefrom.

Similar letters and figures refer to similar parts throughout the several views.

A represents a post toward which the wire is intended to be drawn.

B is the chain, constituted of links having suitable openings $l$ therein and provided with a hook C, which is also furnished with a wire clamp for use when the end of a wire instead of a post is attached to that end of the chain.

D is the stretcher-frame, preferably metallic, and provided at one end with a wire-clamp seat E and at the other end with a longitudinal bifurcation D' to furnish a seat for the pivoted gravity-hook F and for the chain bearing and tightening wheel G. The hook F is pivotally seated in the frame D by means of a transverse rivet or bolt 2, and said hook F is bifurcated at its lower end in the line of the frame D to afford an opening F', through which the chain B passes onto the upper side of the wheel G, which wheel is pivotally seated in the bifurcation D' of the frame D by means of a transverse bolt or rivet 3 or by having its axis cast integral with itself and inserted in corresponding recesses in the inner surface of the walls of said bifurcation.

H is a hand-lever sleeved at its upper end in any suitable mode on the axis of the wheel G and, projecting radially parallel with said wheel, is embedded laterally in a recess 4, formed in the adjacent edge of the rim G', which forms the periphery of the wheel G. A lug 8, formed on the adjacent side of the wheel G in position to abut against the contiguous corner of the lever H, affords an end purchase for said lever. On the periphery of the wheel G, on the portion thereof which projects above the frame D, there is formed a tooth or hook J, adapted alternately to engage and to release the chain B in the oscillations of said wheel, accomplished through the medium of the lever H. When the lever H is swung from the post A, the tooth J is withdrawn from the link of the chain B, (through which it was projected,) the hook F meanwhile holding the frame D and the wire K taut, and the hook J engages another link $l$ of the chain B nearer the post A. As the lever H is drawn toward the post A, the frame D and wire K, held to said frame by the clamp E, are forced toward the post A, and the hook F is coincidently pushed out of engagement with the chain B and carried toward the post A, and when the lever H has reached the limit of its oscillation toward the post A the hook F by its own gravity engages another link $l$ of said chain, then directly below said hook, and holds the frame D and its attached wire K against retrogression while the operator is releasing and re-engaging the tooth J. When the wire K is drawn sufficiently tight, its projecting end 5 can be fastened to the post A in any suitable mode and the tightener removed. The operation is the same when the end of another wire attached to hook C is substituted for the post A. The hook C, in addition to being provided with the clamp L and the opposing clamp-lug M, is provided with a rear hook N. Seated in a recess 6 in the shank of hook C and adapted to engage the chain B is a washer O. This washer is countersunk in the face adjacent the clamp-lug M and is held down on the end of the chain B to prevent the casual unloosening of the latter by the shank of the clamp-lever L. The wire-clamp E is of the usual form.

The operation of my invention has been heretofore described, and it is necessary only to add that the end of the chain B, after passing over the wheel G, hangs disengaged down through the bifurcation D' of the frame D, which prevents the withdrawal of the portion of said chain resting on the wheel G in the oscillations of the latter.

What I claim as my invention, and desire to secure by Letters Patent of the United States, is—

1. The combination of the frame D, the wheel G, suitably pivoted therein and provided with the chain-bearing rim G', lug 8, tooth J, and recess 4, the lever H, articulated near one end on the axis of said wheel and projected through said recess 4, and a hook pivotally connected with the frame, substantially as shown, and for the purpose described.

2. The combination of the hook C, having a recess 6 in its shank and a rear hook N, a recessed washer O in the recess of the hook C, adapted to hold the end of a chain between its recessed portion and the bottom of the recess in the hook, and a clamping-lever, substantially as described.

In testimony whereof I affix my signature in presence of two witnesses.

CHARLES H. SALISBURY.

Witnesses:
SAML. P. BRADSHAW,
JOHN F. BERGQEVIST.